(12) United States Patent
Yu et al.

(10) Patent No.: US 11,368,999 B2
(45) Date of Patent: Jun. 21, 2022

(54) LINK SETUP METHOD, DEVICE, AND WIRELESS COMMUNICATIONS SYSTEM

(71) Applicant: HUAWEI TECHNOLOGIES CO., LTD., Guangdong (CN)

(72) Inventors: Haifeng Yu, Beijing (CN); Xin Xiong, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 331 days.

(21) Appl. No.: 16/356,275

(22) Filed: Mar. 18, 2019

(65) Prior Publication Data

US 2019/0215893 A1 Jul. 11, 2019

Related U.S. Application Data

(63) Continuation of application No. PCT/CN2017/101920, filed on Sep. 15, 2017.

(30) Foreign Application Priority Data

Sep. 19, 2016 (CN) .......................... 201610832222.9

(51) Int. Cl.
*H04W 76/27* (2018.01)
*H04W 76/15* (2018.01)
(Continued)

(52) U.S. Cl.
CPC .......... *H04W 76/27* (2018.02); *H04W 36/30* (2013.01); *H04W 56/0045* (2013.01);
(Continued)

(58) Field of Classification Search
None
See application file for complete search history.

(56) References Cited

U.S. PATENT DOCUMENTS

2014/0323048 A1  10/2014 Kang et al.
2014/0337935 A1  11/2014 Liu et al.
(Continued)

FOREIGN PATENT DOCUMENTS

CN  103067994 A  4/2013
CN  104160730 A  11/2014
(Continued)

OTHER PUBLICATIONS

3GPP TR 22.862 V14.0.0 (Jun. 2016);3rd Generation Partnership Project;Technical Specification Group Services and System Aspects;Feasibility Study on New Services and Markets Technology Enablers—Critical Communications;Stage 1 (Release 14),total 32 pages.

(Continued)

*Primary Examiner* — Ayaz R Sheikh
*Assistant Examiner* — Sori A Aga
(74) *Attorney, Agent, or Firm* — Womble Bond Dickinson (US) LLP

(57) ABSTRACT

A terminal device can modify, through an RRC link providing a normal service, an RRC link in which an RLF or channel quality deterioration occurs, so that the terminal device maintains RRC links to at least two network devices, thereby ensuring RRC reliability while the failed RRC link or the RRC link whose channel quality is poor is replaced in time. The method includes: sending, by a terminal device, a first link modification request to a first network device through a first RRC link; receiving, by the terminal device, an RRC link modification message and a transmission parameter that are sent by the first network device through the first RRC link; and setting up, by the terminal device, a target RRC link to a target network device based on the transmission parameter, and maintaining both the target RRC link and the first RRC link.

20 Claims, 3 Drawing Sheets

(51) Int. Cl.
 H04W 76/11 (2018.01)
 H04W 36/30 (2009.01)
 H04W 56/00 (2009.01)
 H04W 72/14 (2009.01)
 H04W 76/19 (2018.01)
(52) U.S. Cl.
 CPC ............ H04W 76/11 (2018.02); H04W 76/15 (2018.02); *H04W 72/14* (2013.01); *H04W 76/19* (2018.02)

(56) References Cited

U.S. PATENT DOCUMENTS

| 2016/0192261 A1* | 6/2016 | Wang | H04W 36/0011 370/331 |
| 2016/0255552 A1* | 9/2016 | Uchino | H04B 7/024 370/329 |
| 2017/0155481 A1* | 6/2017 | Miao | H04W 76/15 |
| 2017/0195996 A1* | 7/2017 | Fujishiro | H04W 24/02 |

FOREIGN PATENT DOCUMENTS

| CN | 104980980 A | | 10/2015 | |
| WO | 2013/091161 | * | 6/2013 | ............ H04W 36/08 |
| WO | 2013/091161 A1 | | 6/2013 | |

OTHER PUBLICATIONS

3GPP TR 38.913 V0.4.0 (Jun. 2016);3rd Generation Partnership Project;Technical Specification Group Radio Access Network;Study on Scenarios and Requirements for Next Generation Access Technologies;(Release 14),total 35 pages.

XP050132811 R2-063329 Alcatel,"Access Alternatives for Handover",3GPP TSG-RAN#56 WG 2 LTE Riga, Latvia Oct. 2006-Nov. 10, 2006,total 6 pages.

* cited by examiner

LINK SETUP METHOD, DEVICE, AND WIRELESS COMMUNICATIONS SYSTEM

CROSS-REFERENCE TO RELATED APPLICATIONS

This application is a continuation of an International Application No. PCT/CN2017/101920, filed on Sep. 15, 2017, which claims priority to Chinese Patent Application No. 201610832222.9, filed on Sep. 19, 2016. The disclosures of the aforementioned applications are hereby incorporated by reference in their entireties.

TECHNICAL FIELD

This application relates to the wireless communications field, and in particular, to a link setup method, a device, and a wireless communications system.

BACKGROUND

Availability of a radio access network (RAN) is an important indicator for measuring performance of the radio access network, and the availability is a ratio of communication duration that satisfies a pre-defined latency condition and a reliability condition to total communication duration. To ensure the availability of the RAN, a Radio Resource Control (RRC) link between a network device and a terminal device needs to be maintained connected for a long period.

However, during practical application, due to signal interference, movement of the terminal device, or the like, channel quality deterioration or even a radio link failure (RLF) occurs in the RRC link between the network device and the terminal device. When channel quality deterioration occurs in the RRC link, the terminal device needs to reestablish or resume the RRC link between the terminal device and the network device in an RRC link reestablishment manner or an RRC link resuming manner.

However, regardless of using the RRC link reestablishment manner or the RRC link resuming manner, the original RRC link between the terminal device and the network device is disconnected, so random access needs to be performed again. During a random access procedure, the original RRC link is disconnected. Before a new RRC link is set up or the original RRC link is resumed, no available RRC link exists between the terminal device and the network device, affecting data transmission. The random access procedure needs to consume a relatively long period, and in the random access procedure, no RRC link is available for data transmission. Consequently, reliable data transmission cannot be performed between the terminal device and the network device in the random access procedure, and communication between the terminal device and the network device cannot satisfy the pre-defined latency condition and the reliability condition, causing adverse impact to the availability of the RAN.

SUMMARY

This application provides a link setup method, a device, and a wireless communications system. A terminal device maintains RRC links to at least two network devices for a long period. When a radio link failure (RLF) declared or channel quality deterioration occurs, a link modification request may be initiated through a link providing a normal service, so that the RRC link in which the RLF or the signal deterioration occurs is replaced in time. Therefore, the RRC link is not disconnected for a long period, helping satisfying the severe performance indicators of a 5G service.

In addition, time consumed by an RRC link setup process is shortened, to reduce adverse impact, on availability of a RAN, caused by the procedure of setting up the RRC link by the terminal device.

According to a first aspect, this application provides a link setup method. The method may be applied to a terminal device that sets up and maintains a first RRC link to a first network device. The method includes: sending, by the terminal device, a first link modification request to the first network device through the first RRC link, where the first link modification request carries a device identifier of a target network device, to request to set up a target RRC link to the target network device; receiving, by the terminal device, a second modification indication sent by the first network device through the first RRC link, where the second modification indication includes an RRC link modification message and a transmission parameter, and the RRC link modification message and the transmission parameter are both generated by the target network device; and after receiving the RRC link modification message, setting up, by the terminal device, the target RRC link to the target network device based on the transmission parameter, and maintaining both the target RRC link and the first RRC link. There may be one or more target network devices. In one embodiment, when the first RRC link can normally work, the terminal device can set up the target RRC link through the first RRC link, so that at least two RRC links exist between the terminal device and the network device, thereby shortening latency in which there is no available RRC link between the terminal device and the network device, and reducing adverse impact, on availability of a RAN, caused by the RRC link setup process. In addition, the target RRC link is set up through the first RRC link providing a normal service, so that time consumption of the RRC link setup process can be reduced, thereby further reducing the adverse impact, on the availability of the RAN, caused by the RRC link setup procedure.

In one embodiment, before the sending, by the terminal device, a first link modification request to the first network device through the first RRC link, the method further includes: selecting, by the terminal device, the target network device, and determining the device identifier of the target network device. In this implementation, the terminal device can select a network device to which an RRC link is established, thereby improving flexibility of the setup of the RRC link.

In one embodiment, the sending, by the terminal device, a first link modification request to the first network device through the first RRC link includes: when an established second RRC link is faulty, sending, by the terminal device, the first link modification request to the first network device through the first RRC link, where the first link modification request carries the device identifier of the target network device, and the first RRC link is different from the second RRC link.

In one embodiment, the setting up, by the terminal device, the target RRC link to the target network device based on the transmission parameter, and maintaining both the target RRC link and the first RRC link includes: reestablishing or resuming, by the terminal device, the second RRC link based on the transmission parameter, and maintaining both the second RRC link and the first RRC link. In the foregoing two implementations, when the RRC link set up between the terminal device and the network device is disconnected, reestablishment or resuming of the RRC link is rapidly implemented.

In one embodiment, the setting up, by the terminal device, the target RRC link to the target network device based on the transmission parameter includes: when the transmission parameter is uplink scheduling information used to schedule an RRC link modification complete message, sending, by the terminal device, the RRC link modification complete message to the target network device in uplink based on scheduling using the uplink scheduling information, where the uplink scheduling information includes a timing advance TA adjustment command and an uplink scheduling grant UL Grant of the target network device. In this implementation, the terminal device can directly set up the target RRC link based on the scheduling of the target network device, thereby reducing RRC signaling transmission between the first network device and the terminal device, and reducing load of the target network device.

In one embodiment, the setting up, by the terminal device, the target RRC link to the target network device based on the transmission parameter includes: when the transmission parameter is a cell radio network temporary identifier C-RNTI used for scheduling performed by the target network device, sending, by the terminal device, the RRC link modification complete message to the first network device through the first RRC link; and monitoring, by the terminal device, downlink scheduling information of the target network device using the C-RNTI. In this implementation, the terminal device can obtain the uplink scheduling information through the first RRC link providing a normal service, thereby shortening time consumed by obtaining the uplink scheduling information by the terminal device, and further accelerating the procedure of setting up the target RRC link.

In one embodiment, the sending, by the terminal device, a first link modification request to the first network device through the first RRC link includes: after the first RRC link is set up, if a quantity of RRC links maintained between the terminal device and all network devices does not reach a threshold, sending, by the terminal device, the first link modification request to the first network device through the first RRC link. In this implementation, the terminal device can set up more RRC links through the established first RRC link, so that at least two RRC links can be set up and maintained between the terminal device and the network device, thereby further reducing the adverse impact, on the availability of the RAN, caused by the RRC link setup procedure.

In one embodiment, the first link modification request includes: an RRC link resume request message, an RRC link setup request message, an RRC link reestablishment request message, or another uplink RRC message.

According to a second aspect, this application further provides another link setup method, applied to a first network device that sets up and maintains a first RRC link to a terminal device. The method includes: receiving, by the first network device, a first link modification request sent by the terminal device through the first RRC link, where the first link modification request carries a device identifier; determining, by the first network device, a target network device corresponding to the device identifier; sending, by the first network device, a second link modification request to the target network device; receiving, by the first network device, a first modification indication sent by the target network device, where the first modification indication includes a container message of an RRC link modification message and a transmission parameter, and the first modification indication is sent by the target network device in response to the second link modification request; and sending, by the first network device, a second modification indication to the terminal device through the first RRC link, where the second modification indication includes the RRC link modification message and the transmission parameter.

In one embodiment, the first network device can help, through the first RRC link that normally works, the terminal device set up a target RRC link, thereby greatly shortening latency consumed by an RRC link setup process, and reducing an adverse impact, on availability of a RAN, caused by the procedure of setting up the RRC link by the terminal device.

In one embodiment, the second link modification request is a context of the terminal device on the second RRC link. In this implementation, the first network device sends the context to the target network device, so that the target network device can replace the second RRC link with the target RRC link.

In one embodiment, the context includes an uplink signal configuration used for timing used by the terminal device.

In one embodiment, the context includes the uplink signal configuration, so that the target network device can directly generate uplink scheduling information.

In one embodiment, the transmission parameter includes: the uplink scheduling information of the terminal device in the target network device; or a network device cell radio network temporary identifier C-RNTI of the target network device.

In one embodiment, the method further includes: receiving, by the first network device, an RRC link modification complete message sent by the terminal device; and sending, by the first network device, the RRC link modification complete message to the target network device.

In one embodiment, the first network device can help transmit the RRC link modification complete message, to accelerate the procedure of setting up the target RRC link.

According to a third aspect, this application further provides another link setup method, including: receiving, by a target network device, an second link modification request sent by a first network device, where the RRC link modification request is sent after the first network device receives an RRC link modification request sent by a terminal device through a first RRC link; and sending, by the target network device in response to the second link modification request, an RRC link modification message and a transmission parameter used to set up a target RRC link between the terminal device and the target network device to the terminal device through the first network device.

In one embodiment, the target network device can set up the target RRC link through the first RRC link that can normally work, so that RRC reliability is ensured while latency consumed by the RRC link setup procedure is shortened, thereby helping reduce adverse impact, on availability of a RAN, caused by the RRC link setup procedure.

In one embodiment, generating, by the target network device in response to the second link modification request, the transmission parameter includes: when the second link modification request carries an uplink signal configuration required for calculating timing advance used by the terminal device, generating, by the target network device, an uplink scheduling grant UL Grant, and generating a timing advance TA adjustment command based on the uplink signal configuration.

In one embodiment, generating, by the target network device in response to the second link modification request, the transmission parameter includes: obtaining, by the target network device, a cell radio network temporary identifier C-RNTI used for scheduling performed by the target network device.

According to a fourth aspect, this application further provides a terminal device. The terminal device includes unit modules such as a sending unit, a receiving unit, and a processing unit that are configured to perform the method operations according to the first aspect or each implementation of the first aspect. The receiving unit may be implemented using a transceiver module of the terminal device, or may be implemented by a processor by controlling the transceiver module. The sending unit may also be implemented using the transceiver module of the terminal device, or may be implemented by the processor by controlling the transceiver module. The processing unit may be implemented by the processor.

According to a fifth aspect, this application further provides a network device. The network device includes unit modules such as a sending unit, a receiving unit, and a processing unit that are configured to perform the method operations according to each implementation of the second aspect or the first aspect, or includes unit modules such as a sending unit, a receiving unit, and a processing unit that are configured to perform the method operations according to each implementation of the third aspect or the first aspect. The receiving unit may be implemented using a transceiver of the terminal device, or may be implemented by a processor by controlling the transceiver; the sending unit may also be implemented using the transceiver of the terminal device, or may be implemented by the processor by controlling the transceiver; and the processing unit may be implemented by the processor.

According to a sixth aspect, this application further provides a wireless communications system. The wireless communications system may include a terminal device, a first network device, and a target network device. The first network device may be configured to perform the method operations according to the second aspect and each implementation of the second aspect, and the target network device may be configured to perform the method operations according to the third aspect or each implementation of the third aspect. The wireless communications system may further include at least one terminal device, and the at least one terminal device may be configured to perform the method operations according to the first aspect or each implementation of the first aspect. Alternatively, the wireless communications system includes the terminal device according to the fourth aspect or the network device according to the fifth aspect.

In the technical solutions provided in this application, the terminal device can set up the target RRC link through the first RRC link that can normally work, thereby greatly shortening the latency consumed by the RRC link setup process, and reducing the adverse impact, on the availability of the RAN, caused by the process of setting up the RRC link by the terminal device.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

This application can be applied to a wireless communications system including a network device and a terminal device, for example, an LTE system; or other wireless communications system using various wireless access technologies, for example, a system using an access technology such as Code Division Multiple Access, Frequency Division Multiple Access, Time Division Multiple Access, orthogonal frequency division multiple access, or single carrier frequency division multiple access, and a subsequent evolved system such as a fifth-generation (5G) system.

In embodiments of this application, the terminal device may be a device that provides voice and/or data connectivity to a user, a handheld device having a wireless connection function, or another processing device connected to a radio modem. The terminal device may communicate with one or more core networks using a radio access network (RAN). The terminal device may be a mobile terminal, such as a mobile phone (or referred to as a "cellular" phone) or a computer having a mobile terminal, for example, may be a portable, pocket-sized, handheld, computer built-in, or in-vehicle mobile apparatus. The terminal device exchanges voice and/or data with the radio access network. For example, the terminal device may be a device such as a personal communication service (PCS) phone, a cordless telephone set, a Session Initiation Protocol (SIP) phone, a wireless local loop (WLL) station, or a personal digital assistant (PDA). The terminal device may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE).

In the embodiments of this application, the network device may be a base station, an enhanced base station, a relay having a scheduling function, a device having a base station function, or the like. The base station may be an evolved NodeB (eNB) in an LTE system, or a base station in another system. This is not limited in this embodiment of this application. Each network device may provide a service to at least one cell, or different network devices may provide services to a same cell.

Figure 1:
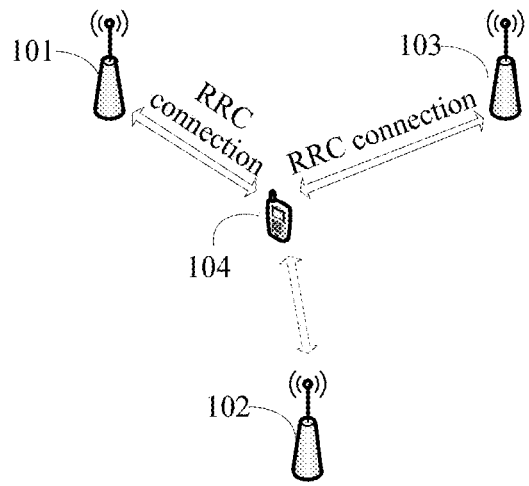
FIG. 1 is a schematic diagram of an RRC link between a terminal device and a network device according to this application.

FIG. 1 is a schematic structural diagram of a radio access network according to this application.

As shown in FIG. 1, the radio access network may include at least two network devices. Each network device may correspond to a cell, and provide a service to only the cell corresponding to the network device. A terminal device may maintain RRC links to at least two network devices in the RAN, to improve availability of the RAN, and satisfy the transmission requirements of a low latency and high reliable service. When the terminal device maintains the RRC links to the at least two network devices, if a radio link failure occurs in one of the RRC links, at least one available RRC link still exists between the terminal device and the RAN, thereby avoiding a case in which the terminal device cannot communicate with the network device because a control plane connection is disconnected.

For example, as shown in FIG. 1, the terminal device may have a first RRC link to a first network device, and further have a second RRC link to a second network device. The terminal device maintains the RRC links to the first network device and the second network device, so that when one of the RRC links is faulty, the other RRC link can still normally transmit RRC signaling, so that it is ensured that the RRC link between the terminal device and the RAN is not broken for a long period, thereby greatly improving the availability of the RAN.

Due to signal interference, movement of the terminal device, or the like, a case in which channel quality deterioration or a radio link failure occurs in the RRC link cannot be avoided. When the terminal device maintains RRC links to at least two network devices in the RAN, if one of the RRC links is faulty, for example, channel quality deterioration or a radio link failure occurs, the terminal device may still resume the disconnected RRC link or set up a new RRC link through the RRC link that is normally used, to avoid time consumption caused by reestablishing or resuming the RRC link in a random access manner, and reduce, as much as possible, a case in which the terminal device has an RRC link to only one network device, thereby ensuring relatively high availability of the RAN.

In the embodiments of this application, the first RRC link may be any RRC link through which the terminal device and the network device can normally communicate with each other, and the second RRC link may be an RRC link other than the first RRC link between the terminal device and the network device. The first network device and the second network device usually are different network devices, and a target network device and the second network device may be a same network device. When the first network device serves a first cell, and the second network device serves a second cell, the first network device and the second network device may alternatively be a same network device. The first network device and the second network device belong to a same RAN.

Figure 2:
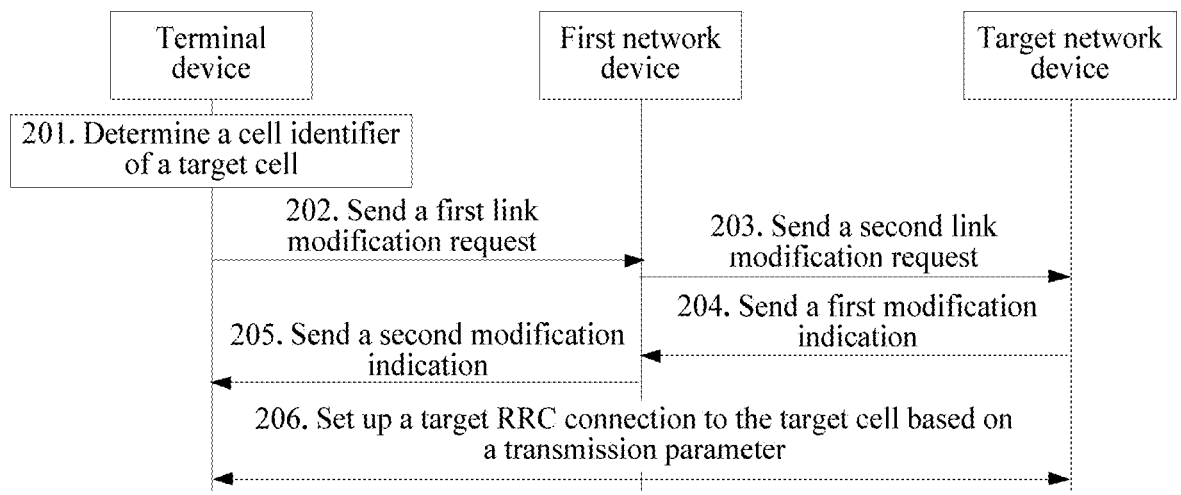
FIG. 2 is a flowchart of an embodiment of a link setup method according to this application.

FIG. 2 is a flowchart of an embodiment of a link setup method according to this application. The method in this embodiment may be applied after a terminal device sets up a first RRC link to a first network device.

Operation 201: The terminal device determines a device identifier of a target network device.

When a preset condition is satisfied, the terminal device may select a network device that the terminal device can access from network devices included in a RAN as the target network device, and determine the device identifier of the target network device. The target network device may be a second network device, or may be another network device.

Preset conditions are different based on different actual requirements. The preset condition may be that after the first RRC link is set up, the terminal device further needs to set up another RRC link to another network device, to implement that RRC links exists between the terminal device and at least two network devices. Alternatively, the preset condition may be that after both the first RRC link and a second RRC link are set up, a target RRC link is set up to replace the second RRC link, to ensure that RRC links exists between the terminal device and at least two network devices.

In addition to the fact that the terminal device selects the target network device, the terminal device may further determine the target network device and the device identifier of the target network device according to indication information sent by the network device.

For example, when the second network device is overloaded, and another network device is required to provide a service to the terminal device to reduce the load of the second network device, the second network device may alternatively send indication information to the terminal device through the second RRC link or through the first network device through the first RRC link. The indication information may carry the device identifier of the target network device.

Operation 202: The terminal device sends a first link modification request to the first network device through the first RRC link, where the first link modification request may carry the device identifier of the target network device.

The first RRC link is set up and can normally work, so that after the device identifier is determined, the terminal device may send the first link modification request to the first network device through the first RRC link. The first link modification request may be used to request to set up the target RRC link. There may be various types of signaling for carrying the first link modification request, for example, the first link modification request may be carried in an RRC link resume request message, an RRC link setup request message, an RRC link reestablishment request message, or another uplink RRC message; or the first link modification request may alternatively be the request message.

In one embodiment, after the first RRC link is set up between the terminal device and the first network device, if a quantity of RRC links maintained between the terminal device and all network devices does not reach a threshold, the terminal device may send the first link modification request to the first network device through the first RRC link, to set up the target RRC link, thereby implementing that RRC links exist between the terminal device and at least two network devices. In this case, the target network device is the second network device.

In one embodiment, when at least two RRC links such as the first RRC link and the second RRC link are set up and maintained between the terminal device and the network device, if a radio link failure (RLF) or channel quality deterioration occurs in the second RRC link, the terminal device sends the first link modification request to the first network device through the first RRC link, to set up the target RRC link to replace the second RRC link. In this case, the target network device may be the second network device, or may be a network device other than the second network device. That an RLF occurs in the second RRC link may include: an integrity check failure indication for the second RRC link is received from a physical layer, a reconfiguration failure occurs in the second RRC link, or the like. That channel quality deterioration occurs in the second RRC link may be that channel quality of the second RRC link is less than a pre-defined value or the like.

Operation 203: The first network device sends a second link modification request to the target network device.

After receiving the first link modification request sent by the terminal device through the first RRC link, the first network device may determine the target network device based on the device identifier carried in the first link request, and then sends the second link modification request to the target network device. The second link modification request may be used to request the target network device to set up an RRC link to the terminal device. Signaling used to carry the second link modification request may be the same as signaling used to carry the first link modification request.

When an objective of setting up the target RRC link is to replace the established second RRC link, to enable the target network device to rapidly set up or resume the RRC link between the target network device and the terminal device, the first network device may further obtain a context of the terminal device on the second RRC link, and generate a second link modification request carrying the context or use the context as the second link modification request. When the second RRC link modification request is modified to the context, the context may include an uplink signal configuration used for timing used by the terminal device.

Operation 204: The target network device sends a first modification indication to the first network device.

The first modification indication may include a container message of an RRC link modification message and a transmission parameter.

After receiving the second link modification request, the target network device may determine the transmission parameter used by the terminal device to access the target network device, and send the transmission parameter and the RRC link modification message to the first network device. The RRC link modification message may be carried in a form of the container message.

Based on different preset settings, specific content included in the transmission parameter may also vary. Usually, the transmission parameter may include a C-RNTI of the target network device. When the second RRC link modification request carries other information, the transmission parameter may alternatively include other information.

For example, when the second link modification request carries the uplink signal configuration required for calculating the timing used by the terminal device, the target network device generates an uplink scheduling grant UL Grant, generates a timing advance TA adjustment command based on the uplink signal configuration, and adds the uplink scheduling grant and the timing advance TA adjustment command to the transmission parameter.

Operation 205: The first network device sends a second modification indication to the terminal device through the first RRC link.

The second modification indication may include the RRC link modification message and the transmission parameter.

After receiving the RRC link modification message and the transmission parameter, the first network device may forward the RRC link modification message and the transmission parameter to the terminal device through the first RRC link.

Operation 206: The terminal device sets up a target RRC link to the target network device based on a transmission parameter.

After the terminal device receives the RRC link modification message, it indicates that the target network device already allows the terminal device to set up the RRC link to the target network device. Therefore, the terminal device may set up the target RRC link based on the transmission parameter, and send an RRC link modification complete message to the target network device, to complete the setup of the target RRC link.

Based on different content of the transmission parameter, manners of sending the RRC link modification complete message to the target network device by the terminal device may also be different.

For example, when the transmission parameter includes the C-RNTI of the target network device, the terminal device may send the RRC link modification complete message to the first network device through the first RRC link, and the first network device forwards the RRC link modification complete message to the target network device. In addition to sending the RRC link modification complete message, the terminal device may further monitor downlink scheduling information of the target network device using the C-RNTI, to complete data transmission based on the downlink scheduling information.

For another example, when the transmission parameter is uplink scheduling information, the terminal device sends the RRC link modification complete message to the target network device based on scheduling using the uplink scheduling information, to indicate that the target RRC link is set up.

The target RRC link is set up using the method provided in this embodiment. Because a random access process is avoided, time consumed by the target RRC link setup process can be greatly shortened. Therefore, a case in which the terminal device has an RRC link to only one network device is reduced, thereby ensuring relatively high availability of the RAN.

Figure 3:
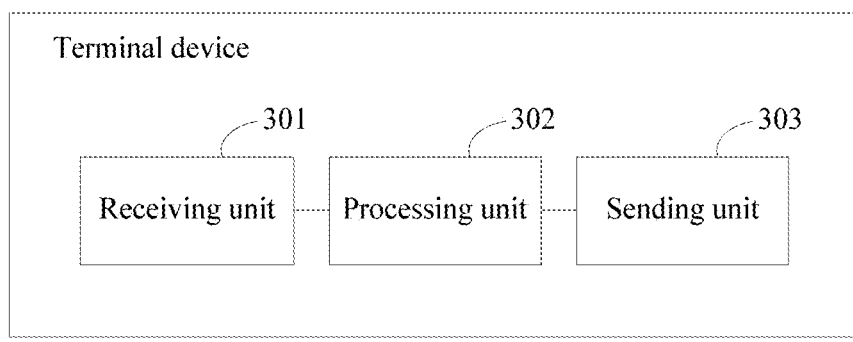
FIG. 3 is a schematic structural diagram of an embodiment of a terminal device according to this application.

FIG. 3 is a schematic structural diagram of an embodiment of a terminal device according to this application. The terminal device may be the terminal device in any of the foregoing embodiments.

As shown in FIG. 3, the terminal device may include a receiving unit 301, a processing unit 302, and a sending unit 303.

The sending unit 303 is configured to send a first link modification request to a first network device through a first RRC link, and the first link modification request carries a device identifier of a target network device, to request to set up a target RRC link to the target network device. The receiving unit 301 is configured to receive a second modification indication sent by the first network device through the first RRC link, and the second modification indication includes an RRC link modification message and a transmission parameter, and the RRC link modification message and the transmission parameter are both generated by the target network device. The processing unit 302 is configured to: after the receiving unit 301 receives the RRC link modification message, set up the target RRC link to the target network device based on the transmission parameter, and maintain the target RRC link and the first RRC link.

In one embodiment, the processing unit 302 is further configured to: select the target network device, and determine the device identifier of the target network device.

In one embodiment, the sending unit 303 is further configured to: when an established second RRC link is faulty, send the first link modification request to the first network device through the first RRC link, and the first link modification request carries the device identifier of the target network device.

In one embodiment, the sending unit 303 is further configured to: after the first RRC link is set up, if a quantity of RRC links maintained between the terminal device and all network devices does not reach a threshold, send the first link modification request to the first network device through the first RRC link.

In one embodiment, the processing unit 302 is further configured to: reestablish or resume the second RRC link based on the transmission parameter, and maintain the second RRC link and the first RRC link.

In one embodiment, the sending unit 303 is further configured to: when the transmission parameter is uplink scheduling information used to schedule an RRC link modification complete message, send the RRC link modification complete message to the target network device in uplink based on scheduling using the uplink scheduling information, and the uplink scheduling information includes a timing advance TA adjustment command and an uplink scheduling grant UL Grant of the target network device.

In one embodiment, the sending unit 303 is further configured to: when the transmission parameter is a cell radio network temporary identifier C-RNTI used for scheduling performed by the target network device, send the RRC link modification complete message to the first network device through the first RRC link; and the receiving unit is further configured to monitor downlink scheduling information of the target network device using the C-RNTI.

Figure 4:
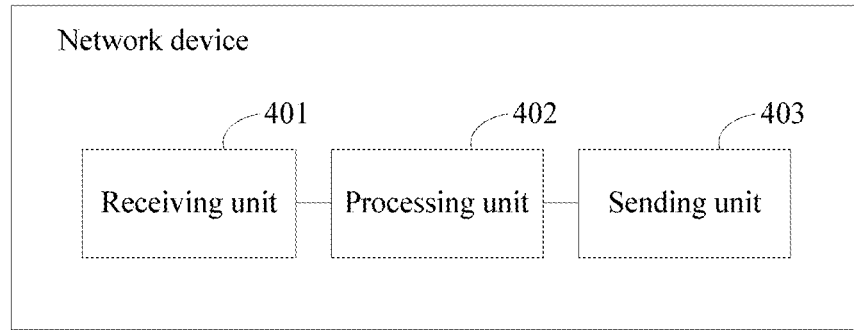
FIG. 4 is a schematic structural diagram of an embodiment of a network device according to this application.

FIG. 4 is a schematic structural diagram of an embodiment of a network device according to this application. The network device may be the first network device, the second network device, or the target network device in the foregoing embodiments.

As shown in FIG. 4, the network device may include a receiving unit 401, a processing unit 402, and a sending unit 403.

When the network device serves the first network device, the receiving unit 401 is configured to receive a first link modification request sent by a terminal device through a first RRC link, and the first link modification request carries a device identifier; the processing unit 402 is configured to determine a target network device corresponding to the device identifier; and the sending unit 403 is configured to send a second link modification request to the target network device. The receiving unit 401 is further configured to receive a first modification indication sent by the target network device, the modification indication includes a container message of an RRC link modification message and a transmission parameter, and the RRC link modification message and the transmission parameter are sent by the target network device in response to the second link modification request. The sending unit 403 is further configured to send a second modification indication to the terminal device through the first RRC link, and the second modification indication includes the RRC link modification message and the transmission parameter.

The second link modification request may include a context of the terminal device on a second RRC link. The context may include an uplink signal configuration used for timing used by the terminal device. The transmission parameter may include uplink scheduling information used to schedule the terminal device to send an RRC link modification complete message to the target network device or a cell radio network temporary identifier C-RNTI used for scheduling performed by the target network device.

In one embodiment, the receiving unit 401 is further configured to receive the RRC link modification complete message sent by the terminal device; and the sending unit 403 is further configured to send the RRC link modification complete message to the target network device.

When the network device is the target network device, the receiving unit 401 is configured to receive a second link modification request sent by a first network device, and the second link modification request is sent after the first network device receives a first link modification request sent by a terminal device through a first RRC link, and the first RRC link is an RRC link between the first network device and the terminal device; the processing unit 402 is configured to generate a transmission parameter in response to the second link modification request, and the transmission parameter is a parameter required for setting up a target RRC link between the terminal device and the target network device; and the sending unit 403 is configured to send a first modification indication to the first network device, and the first modification indication includes a container message of an RRC link modification message and the transmission parameter.

In one embodiment, the processing unit 402 is further configured to: when the second link modification request carries an uplink signal configuration required for calculating timing used by the terminal device, generate an uplink scheduling grant UL Grant, and generate a timing advance TA adjustment command based on the uplink signal configuration.

In one embodiment, the processing unit 402 is further configured to obtain a cell radio network temporary identifier C-RNTI used for scheduling performed by the target network device.

Figure 5:
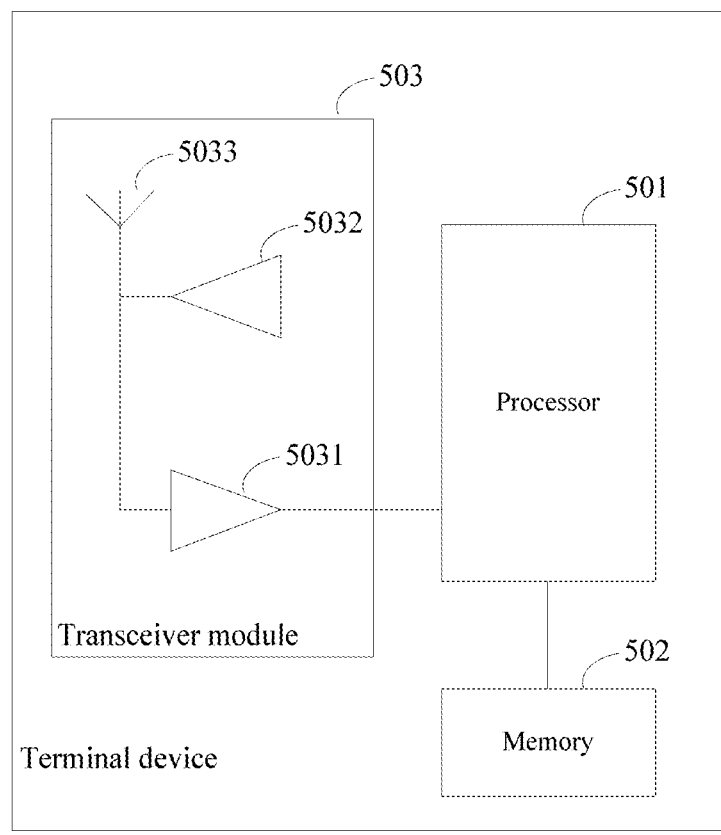
FIG. 5 is a schematic structural diagram of another embodiment of a terminal device according to this application.

FIG. 5 is a schematic structural diagram of an embodiment of a terminal device according to this application. The terminal device may be the terminal device in any of the foregoing embodiments, and configured to implement the method operations that need to be implemented by the terminal device in the foregoing embodiments.

As shown in FIG. 5, the terminal device may include a processor 501, a memory 502, and a transceiver module 503. The transceiver module 503 may include components such as a receiver 5031, a transmitter 5032, and an antenna 5033. The terminal device may alternatively include more components or fewer components, or some components may be combined, or a different component deployment may be used. This is not limited in this application.

The processor 501 is a control center of the terminal device, and is connected to all parts of the entire terminal device through various interfaces and lines. By running or executing a software program and/or module stored in the memory 502, and invoking data stored in the memory 502, the processor 501 performs various functions and/or data processing of the terminal device. The processor 501 may include an integrated circuit (IC), for example, may include a single packaged IC, or may include a plurality of linked packaged ICs that have a same function or different functions. For example, the processor may include only a central processing unit (CPU), or may be a combination of a GPU, a digital signal processor (DSP), and a control chip (such as a baseband chip) in the transceiver module 503. In this embodiment of this application, the CPU may include a single operation core, or may include a plurality of operation cores.

The transceiver module 503 is configured to set up a communications channel, so that the terminal device is linked to a receive device through the communication channel, thereby implementing data transmission to the terminal device. The transceiver module 503 may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, for example, Wideband Code Division Multiple Access (WCDMA) and/or High Speed Downlink Packet Access (HSDPA). The transceiver module 503 is configured to control communication between components in the terminal device, and may support direct memory access.

In different implementations of this application, various communications modules in the transceiver module 503 are usually presented in a form of an integrated circuit chip, and may be selectively combined, and the transceiver module 503 does not need to include all the communications modules and corresponding antenna groups. For example, the transceiver module 503 may include only a baseband chip, a radio frequency chip, and a corresponding antenna, to provide a communication function in a cellular communications system. The terminal device may be linked to a cellular network or the Internet through a wireless communications link, such as wireless local area network access or WCDMA access, set up by the transceiver module 503. In some optional implementations of this application, the communications module, such as the baseband module, in the transceiver module 503, may be integrated into the processor. An APQ+MDM series platform provided by Qualcomm is a typical example. The radio frequency circuit is configured to receive and send a signal during an information receiving and sending process or during a call. For example, the radio frequency circuit receives downlink information from a network device, then sends the downlink information to the processor for processing, and sends uplink-related uplink data to the network device. Usually, the radio frequency circuit includes a known circuit for performing these functions, which includes but is not limited to an antenna system, a radio frequency transceiver, one or more amplifiers, a tuner, one or more oscillators, a digital signal processor, a codec chip set, a subscriber identity module (SIM), a memory, and the like. In addition, the radio frequency circuit may also communicate with a network and another device by means of wireless communication. The wireless communication may use any communications standard or protocol, including, but is not limited to, Global System for Mobile communications (GSM), general packet radio service (GPRS), Code Division Multiple Access (CDMA), Wideband Code Division Multiple Access (WCDMA), High Speed Uplink Packet Access (HSUPA), Long Term Evolution (LTE), email, short message service (SMS), and the like.

The method operations performed by the terminal device in the foregoing embodiments may be performed by the processor 501 or the transceiver 503 in this embodiment. In the foregoing embodiment, the function that needs to be implemented by the receiving unit 301 may be implemented by the transceiver module 503 of the terminal device, or implemented by the transceiver module 503 controlled by the processor 501; the function that needs to be implemented by the sending unit 303 may also be implemented by the transceiver module 503 of the terminal device, or may also be implemented by the transceiver module 503 controlled by the processor 501; and the function that needs to be implemented by the processing unit 302 may be implemented by the processor 501.

Figure 6:
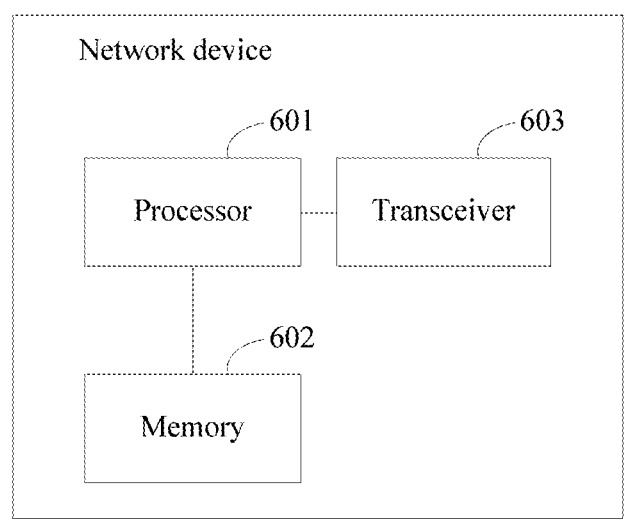
FIG. 6 is a schematic structural diagram of another embodiment of a network device according to this application.

FIG. 6 is a schematic structural diagram of another embodiment of a network device according to this application.

The network device may include a processor 601, a memory 602, a transceiver 603, and the like.

The processor 601 is a control center of the network device, and is connected to all parts of the entire network device through various interfaces and lines. By running or executing a software program and/or module stored in the memory, and invoking data stored in the memory, the processor 601 performs various functions and/or data processing of the network device. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 602 may include a volatile memory, for example, a random access memory (RAM). The memory 30 may alternatively include a non-volatile memory, for example, a flash memory, a hard disk drive (HDD), or a solid-state drive (SSD). The memory may alternatively include a combination of the foregoing types of memories. The memory may store a program or code. A processor in a network element may implement a function of the network element by performing the program or the code.

The transceiver 603 may be configured to receive or send data. The transceiver may send data to a terminal device or another network device under control of the processor. The transceiver receives, under control of the processor, data sent by the terminal device or another network device.

The method operations performed by the first network device or the target network device in the foregoing embodiments may be performed by the processor 601 or the transceiver 603 in this embodiment. In the foregoing embodiment, the function that needs to be implemented by the receiving unit 401 may be implemented by the transceiver 603 of the terminal device, or implemented by the transceiver 603 controlled by the processor 601; the function that needs to be implemented by the sending unit 403 may also be implemented by the transceiver 603 of the terminal device, or may also be implemented by the transceiver 603 controlled by the processor 601; and the function that needs to be implemented by the processing unit 402 may be implemented by the processor 601.

This application further provides a wireless communications system, including a first network device, a target network device, and a terminal device.

The terminal device is configured to send a first link modification request to the first network device through a first RRC link, and the first link modification request carries a device identifier used to identify the target network device. The first network device is configured to: after receiving the first link modification request, determine the target network device corresponding to the device identifier, and send a second link modification request to the target network device. The target network device is configured to: receive the second link modification request sent by the first network device; generate a transmission parameter in response to the second link modification request, where the transmission parameter is a parameter required for setting up a target RRC link between the terminal device and the target network device; and send a first modification indication to the first network device, where the first modification indication includes a container message of an RRC link modification message and the transmission parameter. The first network device is further configured to: receive the RRC link modification message and the transmission parameter; and send a second modification indication to the terminal device through the first RRC link, where the second modification indication includes the RRC link modification message and the transmission parameter. The terminal device is further configured to: set up the target RRC link to the target network device based on the transmission parameter, and maintain the target RRC link and the first RRC link.

Herein, it should be noted that when no RRC link is set up between the terminal device and the first network device, the wireless communications system may alternatively include only the first network device and the target network device. In addition to the first network device and the target network device, the wireless communications system may further include a second network device.

During specific implementation, this application further provides a computer storage medium. The computer storage medium may store a program, and when the program is executed, some or all of the operations of the embodiments of the calling method provided in this application may be performed. The storage medium may be a magnetic disk, an optical disc, a read-only memory (English: read-only memory, ROM), a random access memory (RAM), or the like.

A person skilled in the art may clearly understand that, the technologies in the embodiments of this application may be implemented using software in addition to a necessary general hardware platform. Based on such an understanding, the technical solutions in the embodiments of this application essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of this application.

Mutual reference may be made to same or similar parts in the embodiments in this specification. Especially, device and system embodiments are basically similar to the method embodiment, and therefore are briefly described. For related parts, refer to descriptions in the method embodiment.

The foregoing descriptions are implementation manners of this application, but are not intended to limit the protection scope of this application.

What is claimed is:

1. A link setup method, comprising:
    sending, by a terminal device, a first link modification request to a first network device through a first Radio Resource Control (RRC) link, wherein the first link modification request carries a device identifier of a target network device, to request to set up a target RRC link to the target network device;
    receiving, by the terminal device, a modification indication sent by the first network device through the first RRC link, wherein the modification indication comprises an RRC link modification message and a transmission parameter, and the RRC link modification message and the transmission parameter are both generated by the target network device, wherein the transmission parameter comprises a timing advance (TA) adjustment command or an uplink scheduling grant (UL Grant) of the target network device; and
    setting up, by the terminal device, the target RRC link to the target network device based on the transmission parameter, and maintaining both the target RRC link and the first RRC link, wherein the first network device is different from the target network device.

2. The method according to claim 1, wherein the sending, by a terminal device, a first link modification request to a first network device through a first RRC link comprises:
    selecting, by the terminal device, the target network device, and determining the device identifier of the target network device.

3. The method according to claim 1, wherein the sending, by a terminal device, a first link modification request to a first network device through a first RRC link comprises:
    when a radio link failure (RLF) or channel quality deterioration occurs in an established second RRC link, sending, by the terminal device, the first link modification request to the first network device through the first RRC link, wherein the first RRC link is different from the second RRC link.

4. The method according to claim 3, wherein the setting up, by the terminal device, the target RRC link to the target network device based on the transmission parameter, and maintaining both the target RRC link and the first RRC link comprises:
    reestablishing or resuming, by the terminal device, the second RRC link based on the transmission parameter, and maintaining both the second RRC link and the first RRC link.

5. The method according to claim 1, wherein the sending, by a terminal device, a first link modification request to a first network device through a first RRC link comprises:
    after the first RRC link is set up, if a quantity of RRC links maintained between the terminal device and all network devices does not reach a threshold, sending, by the terminal device, the first link modification request to the first network device through the first RRC link.

6. The method according to claim 1, wherein the setting up, by the terminal device, the target RRC link to the target network device based on the transmission parameters comprises:
    when the transmission parameter is uplink scheduling information used to schedule an RRC link modification complete message, sending, by the terminal device, the RRC link modification complete message to the target network device based on scheduling using the uplink scheduling information, wherein the uplink scheduling information comprises a timing advance (TA) adjustment command and an uplink scheduling grant (UL Grant) of the target network device.

7. The method according to claim 1, wherein the setting up, by the terminal device, the target RRC link to the target network device based on the transmission parameters comprises:
    when the transmission parameter is a cell radio network temporary identifier (C-RNTI) used for scheduling performed by the target network device, sending, by the terminal device, an RRC link modification complete message to the first network device through the first RRC link; and
    monitoring, by the terminal device, downlink scheduling information of the target network device using the C-RNTI.

8. The method according to claim 1, wherein the first link modification request comprises:
    an RRC link resume request message, an RRC link setup request message, or an RRC link reestablishment request message.

9. A link setup method, comprising:
    receiving, by a first network device, a first link modification request sent by a terminal device through a first Radio Resource Control (RRC) link, wherein the first link modification request carries a device identifier of a target network device;

determining, by the first network device, the target network device corresponding to the device identifier;

sending, by the first network device, a second link modification request to the target network device;

receiving, by the first network device, a first modification indication sent by the target network device, wherein the first modification indication comprises a container message of an RRC link modification message and a transmission parameter, wherein the transmission parameter comprises a timing advance (TA) adjustment command or an uplink scheduling grant (UL Grant) of the target network device; and sending, by the first network device, a second modification indication to the terminal device through the first RRC link, wherein the second modification indication comprises the RRC link modification message and the transmission parameter.

10. The method according to claim 9, wherein the second link modification request carries a context of the terminal device on a second RRC link.

11. The method according to claim 10, wherein the context comprises an uplink signal configuration used for calculating a timing advance (TA) used by the terminal device.

12. The method according to claim 9, wherein the transmission parameter comprises:

uplink scheduling information used to schedule the terminal device to send an RRC link modification complete message to the target network device; or a cell radio network temporary identifier (C-RNTI) used for scheduling performed by the target network device.

13. The method according to claim 9, comprising:

receiving, by the first network device, an RRC link modification complete message sent by the terminal device; and sending, by the first network device, the RRC link modification complete message to the target network device.

14. A terminal device, comprising:

a transmitter, configured to send a first link modification request to a first network device through a first Radio Resource Control (RRC) link, wherein the first link modification request carries a device identifier of a target network device, to request to set up a target RRC link to the target network device;

a receiver, configured to receive a modification indication sent by the first network device through the first RRC link, wherein the modification indication comprises an RRC link modification message and a transmission parameter, and the RRC link modification message and the transmission parameter are both generated by the target network device, wherein the transmission parameter comprises a timing advance (TA) adjustment command or an uplink scheduling grant (UL Grant) of the target network device; and a processor, configured to:

after the receiver receives the RRC link modification message, set up the target RRC link to the target network device based on the transmission parameter; and maintain both the target RRC link and the first RRC link.

15. The terminal device according to claim 14, wherein the processor is further configured to:

select the target network device; and determine the device identifier of the target network device.

16. The terminal device according to claim 14, wherein the transmitter is further configured to: when an established second RRC link is faulty, send the first link modification request to the first network device through the first RRC link, wherein the first link modification request carries the device identifier of the target network device, and the first RRC link is different from the second RRC link.

17. The terminal device according to claim 16, wherein the processor is further configured to:

reestablish or resume the second RRC link based on the transmission parameter; and maintain both the second RRC link and the first RRC link.

18. The terminal device according to claim 14, wherein the transmitter is further configured to: after the first RRC link is set up, if a quantity of RRC links maintained between the terminal device and all network devices does not reach a threshold, send, the first link modification request to the first network device through the first RRC link.

19. The terminal device according to claim 14 wherein the transmitter is further configured to: when the transmission parameter is uplink scheduling information used to schedule an RRC link modification complete message, send the RRC link modification complete message to the target network device in uplink based on scheduling using the uplink scheduling information, wherein the uplink scheduling information comprises a timing advance (TA) adjustment command and an uplink scheduling grant (UL Grant) of the target network device.

20. The terminal device according to claim 14, wherein the transmitter is further configured to: when the transmission parameter is a radio network temporary identifier (C-RNTI) used for scheduling performed by the target network device, send the RRC link modification complete message to the first network device through the first RRC link; and the receiver is further configured to monitor downlink scheduling information of the target network device using the C-RNTI.

* * * * *